(12) United States Patent
Hoppert

(10) Patent No.: US 10,417,458 B2
(45) Date of Patent: Sep. 17, 2019

(54) SECURING AN UNPROTECTED HARDWARE BUS

(71) Applicant: Microsoft Technology Licensing, LLC, Redmond, WA (US)

(72) Inventor: Hadden Mark Hoppert, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 279 days.

(21) Appl. No.: 15/441,516

(22) Filed: Feb. 24, 2017

(65) Prior Publication Data

US 2018/0247087 A1   Aug. 30, 2018

(51) Int. Cl.
  *G06F 21/85*   (2013.01)
  *G06F 1/3287*   (2019.01)
  *G06F 9/4401*   (2018.01)
  *G06F 21/81*   (2013.01)

(52) U.S. Cl.
  CPC ............ *G06F 21/85* (2013.01); *G06F 1/3287* (2013.01); *G06F 9/442* (2013.01); *G06F 21/81* (2013.01)

(58) Field of Classification Search
  CPC ....................................................... G06F 21/85
  USPC ........................................................... 726/34
  See application file for complete search history.

(56) References Cited

U.S. PATENT DOCUMENTS

| 5,568,619 | A | 10/1996 | Blackledge et al. |
| 5,632,021 | A | 5/1997 | Jennings et al. |
| 5,968,156 | A | 10/1999 | Kim |
| 6,134,613 | A | 10/2000 | Stephenson et al. |
| 6,157,976 | A | 12/2000 | Tien et al. |
| 6,557,121 | B1 | 4/2003 | McLaughlin et al. |
| 6,574,752 | B1 | 6/2003 | Ahrens et al. |
| 6,691,257 | B1 | 2/2004 | Suffin |
| 7,028,149 | B2 | 4/2006 | Grawrock et al. |
| 7,877,760 | B2 | 1/2011 | Oney et al. |
| 8,024,619 | B2 | 9/2011 | Ageishi |
| 8,930,609 | B2 | 1/2015 | Natu et al. |
| 8,984,190 | B2 | 3/2015 | Lin |
| 9,177,176 | B2 * | 11/2015 | Chen ....................... G06F 21/10 |
| 9,231,921 | B2 | 1/2016 | Raskin et al. |
| 2001/0029585 | A1 * | 10/2001 | Simon .................. G08B 25/008 726/4 |
| 2005/0216791 | A1 | 9/2005 | Liu et al. |

(Continued)

FOREIGN PATENT DOCUMENTS

EP   2657879 A2   10/2013

OTHER PUBLICATIONS

"International Search Report and Written Opinion Issued in PCT Application No. PCT/US18/018574", dated Apr. 20, 2018, 11 Pages.

(Continued)

*Primary Examiner* — Jacob Lipman
(74) *Attorney, Agent, or Firm* — Liang IP, PLLC

(57) ABSTRACT

Techniques are disclosed for securing communication from an unprotected hardware bus. The described techniques may be implemented by placing a secure hardware bus between the unprotected hardware bus and a host computing device. The secure hardware bus acts as a filter to prevent delivery of unsafe data packets to the host computing device. The filtering may be particularly useful for preventing delivery of a data packet that would trigger a reboot of the host computing device.

20 Claims, 5 Drawing Sheets

(56) References Cited

U.S. PATENT DOCUMENTS

2008/0310440 A1* 12/2008 Chen ................. H04L 47/2433
370/413
2011/0141124 A1   6/2011 Halls et al.
2015/0317495 A1  11/2015 Rodgers et al.

OTHER PUBLICATIONS

"Echo Express SEL", http://www.sonnettech.com/product/echoexpresssel.html, Published on: Mar. 15, 2014, 6 pages.

* cited by examiner

SECURING AN UNPROTECTED HARDWARE BUS

BACKGROUND

Hardware buses are commonly used in computing environments to communicate data internally between computing components and externally between computing devices. Many hardware bus protocols are unprotected, however, which poses a security risk to a host computing device when used externally to communicate with untrusted computing devices. For example, an unprotected hardware bus can be used to communicate unsafe data packets from an untrusted computing device to the host device resulting in an escalation of privileges for the untrusted computing device, an unauthorized access to information on the host device, or a system fault notification being received by the host device, which can cause a reboot of the host device.

Unprotected hardware buses pose particular danger when used in a virtual machine environment. In general, a virtual machine environment allows multiple operating system instances or application instances to exist simultaneously on a same host computing device and in isolation from one another. Virtualization also enables multiple operating system instances to share the host computing device's resources, such as to share storage devices, processing devices (e.g., graphics processing units ("GPUs")), networking devices, and so forth. These advances have led to the centralization of many computing resources, enabling various computing tasks to be performed "over the cloud." Thus, with the centralization of computing resources, if unsafe data packets are communicated to the host computing device, not only is the host computing device at risk, but each of the multiple operating system instances are also at risk.

This background provides context for the disclosure. Unless otherwise indicated, material described in this section is not prior art to the claims in this disclosure and is not admitted to be prior art by inclusion in this section.

SUMMARY

Techniques are disclosed for securing communication from an unprotected hardware bus for communication between a host device and an untrusted computing device. The described techniques insulate the host device from the data packets communicated via the unprotected hardware bus by placing a secure hardware bus between them. The secure hardware bus can include a communication channel having a communication path for delivering data packets to the host computing device. The communication channel is in electrical communication with a bridge, which in turn is in electrical communication with the unprotected hardware bus. The secure hardware bus includes a bus computing device to execute instructions to allow delivery of safe data packets to the host computing device, but deny delivery of unsafe data packets. By utilizing the techniques described herein, the communications from the unprotected hardware bus are secured by secure hardware bus between the unprotected hardware bus and the host computing device. This allows for an external and untrusted computing device to efficiently operate the unprotected hardware bus in an untrusted environment being external to the trusted environment that includes the host computing device and the secure hardware bus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
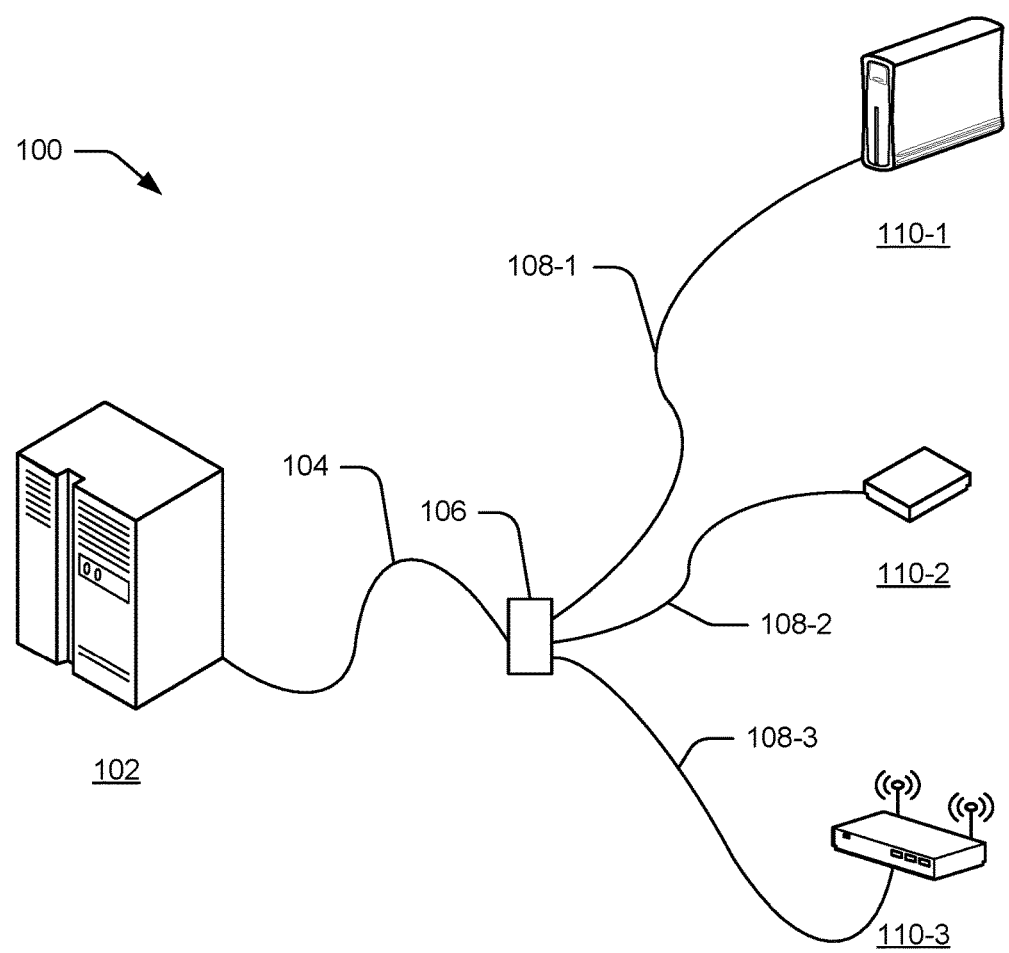
FIG. 1 is an illustration of an example environment in accordance with one or more implementations.

Conventional hardware bus connections are unprotected. For example, peripheral component interconnect hardware buses ("PCI buses") and peripheral component interconnect express hardware buses ("PCIe buses"), which are commonly used to connect peripheral computing devices, are often unprotected. Thus, a host computing device is vulnerable to unsafe data packets delivered from a peripheral computing device. For example, an unsafe data packet may include a notification of a system failure, which causes the host computing device to reboot, ending any processes or applications operated by the host computing device. When the host computing device is a server hosting a virtual machine environment, each operating system instance and application instance is denied service during the reboot.

This document discloses techniques and apparatuses to secure an unprotected hardware bus, and thus protect a host computing device from unsafe data packets communicated via the unprotected hardware bus. This may be accomplished by placing a secure hardware bus between the unprotected hardware bus and the host computing device. The secure hardware bus may act as a filter to deny delivery of unsafe data packets and allow delivery of safe data packets. Thus, the secure hardware bus may be implemented to prevent a system shutdown, or reboot, of the host computing device in response to delivery of unsafe data packets.

In an example implementation, one end of a secure hardware bus, such as a Thunderbolt™ hardware bus, is electrically connected to the host computing device. The other end of the secure hardware bus includes a bridge or adaptor (either a "bridge") for connecting the secure hardware bus to an end of an unprotected hardware bus. The other end of the unprotected hardware bus is electrically connected to an untrusted computing device, such as, a graphics processing unit. The graphics processing unit is configured such that if the graphics processing unit has a system error, it will send a notification of the system error to the host computing device. Thus, the notification is delivered as data packets via the unprotected hardware bus to the secure hardware bus. When received by the secure hardware bus, the data packets are processed via a bus computing device to determine if the data packets are safe or unsafe. Because the system error would cause the host computing device to reboot, the data packets are determined to be unsafe and are therefore denied delivery to the host computing device. The secure hardware bus may then notify the host computing device of the denial of delivery. The host computing device may deliver an instruction or command in response to the notification. For example, the host computing device may instruct the secure hardware bus to reboot, to deliver a reboot command to the untrusted computing device, or to deny all data packets from the untrusted computing device.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures. Finally, an example system and device are described that may be employed to perform various techniques described herein.

Example Environment

FIG. 1 illustrates an environment 100 in an example implementation that is operable to employ the techniques as described herein to secure an unprotected hardware bus. The illustrated environment 100 includes a host computing device 102 for accessing one or more computing resources. By way of example, and not limitation, the host computing device 102 may be personal computer or a server providing a virtual machine environment to a plurality of users. The host computing device 102 is electrically connected to a secure hardware bus 104 to facilitate secured delivery of data packets to the host computing device 102. The secure hardware bus 104 includes a bridge 106 serving as a connector between communication channels of the secure hardware bus 104 and unprotected hardware buses 108-1, 108-2, and 108-3. The unprotected hardware bus 108-1 provides a communication channel to a storage device 110-1, the unprotected hardware bus 108-2 provides a communication channel to a graphics processing unit 110-2, and the unprotected hardware bus 108-3 provides a communication channel to a networking device 110-3. The unprotected hardware bus 108-2, for instance, may be used by the host device 102 to communicate commands to, or requests to access resources of, the graphics processing unit 110-2. Additionally, the graphics processing unit 110-2 may respond to commands or requests to access resources via the unprotected hardware bus 108-2. Additional or alternative untrusted computing devices are contemplated in use with the environment 100 such as a display, a printer, and removable memory.

The bridge 106 may be implemented as one or more of a hardware bus connector, a hardware bus bridge, or a hardware bus translator for translating between different hardware bus protocols. The bridge 106 may include a bus computing device for determining whether a data packet is unsafe. Alternatively, the bus computing device may be located proximal to the host computing device 102. Thus, the bridge 106 is configured as a man-in-the-middle device to protect the host computing device 102 from unsafe data packets. In particular, the bridge 106 may perform a machine check of the peripheral computing devices 110-1, 110-2, and 110-3 rather than the host computing device 102. This prevents a module of the host computing device 102, such as an input/output memory mapping unity, from performing the machine check and rebooting the host computing device 102.

The host computing device 102 may be representative of one or a plurality of different devices, such as one or more servers utilized to perform operations "over the cloud". For example, the host computing device 102 may provide a virtual machine environment to a plurality of users that access resources internal to the host computing device 102 and external to the host computing device 102 such as the storage device 110-1, the graphics processing unit 110-2, and the networking device 110-3.

Example System

Figure 2:
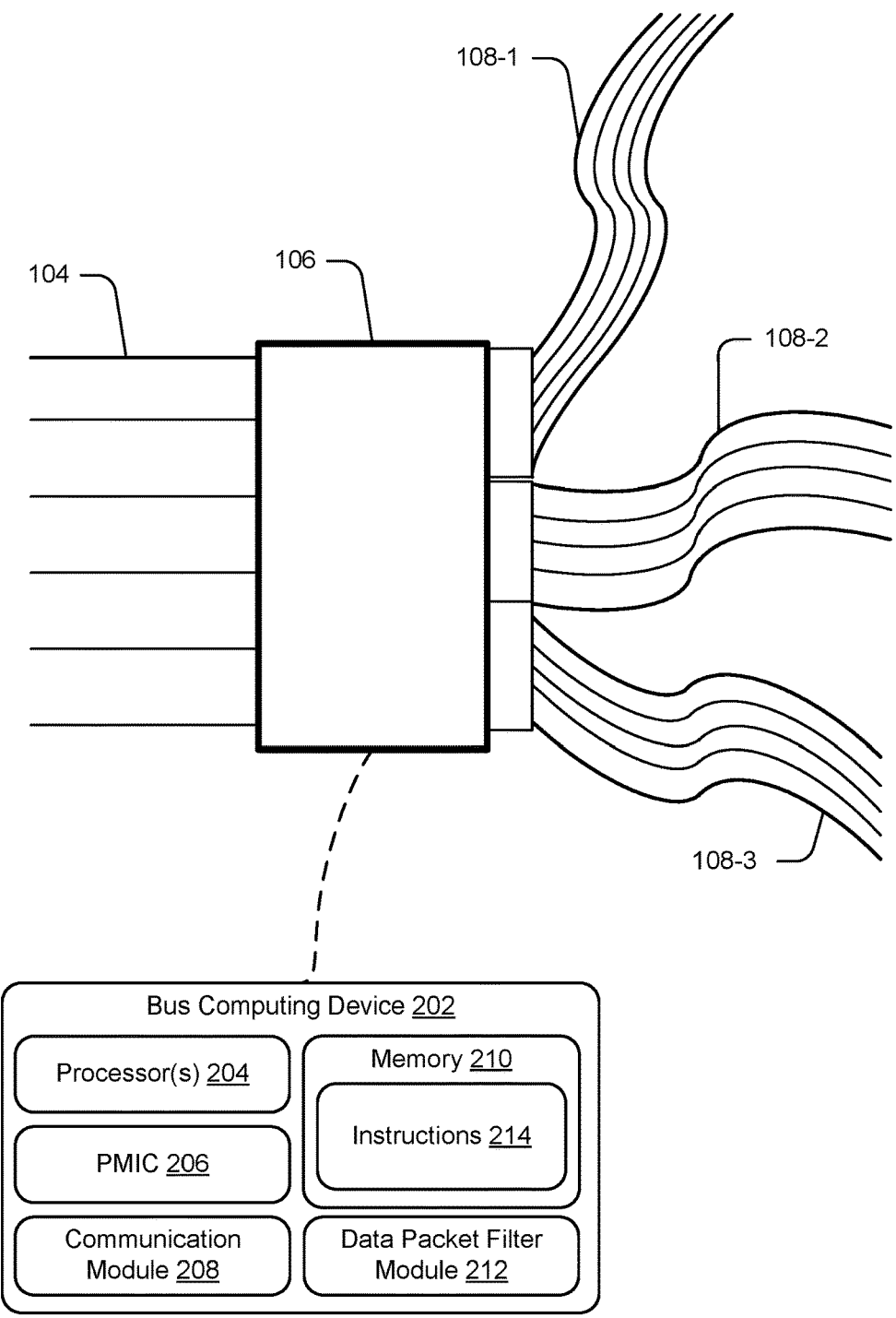
FIG. 2 is an illustration of an example bus computing device in accordance with one or more implementations.

FIG. 2 illustrates an example implementation of the bridge 106 of the secure hardware bus 104 of FIG. 1. The bridge 106 is illustrated as having a plurality of ports for receiving unprotected hardware buses 108-1, 108-2, and 108-3. The bridge 106 includes a bus computing device 202 that in turn includes processor(s) 204, a power management integrated circuit ("PMIC") 206, a communication module 208, memory 210 and a data packet filter module 212. As illustrated, memory 210 includes instructions 214 including computer code for determining whether a data packet is unsafe.

Data packet filter module 212 is configured to execute instructions 214 from the host computing device 102 of FIG. 1 to identify unsafe data packets within a plurality of data packets directed to the host computing device 102 via the secure hardware bus 104. The data packet filter module 212 is also configured to execute the received instructions 214 to deny delivery of unsafe data packets and to allow delivery of safe data packets to the host computing device 102. The instructions 214 may include, for example, a library of unsafe data packets or components of unsafe data packets. Additionally or alternatively, the instructions 214 may include a formula for determining whether a data packet is unsafe.

The processor(s) 204 may be implemented as a field programmable gate array ("FPGA") comprising the data packet filter module 212 for executing instructions 214 programmed within internal memory 210 of the FPGA. Alternatively, the instructions may be stored in external volatile memory, or stored in external non-volatile memory. If stored in volatile memory, whether internal or external to the processor(s) 204, the instructions will be lost in response to a loss of power to the bridge 106. If the instructions are lost, the bus computing device 202 may request new instructions 214 from the host computing device 102 or await receipt of the new instructions 214 after a reboot. Thus, corrupted instructions 214 are removed and new instructions 214 are received from the host computing device 102.

The bus computing device 202 may also be configured to translate data packets from a first hardware bus protocol to a second hardware bus protocol. For example, the processor(s) 204 may be configured to execute a translation between a Thunderbolt™ hardware bus protocol of secure hardware bus 104 and a Peripheral Component Interconnect Express ("PCI-E") protocol of unprotected hardware bus 108-1.

The communication module 208 is configured to notify the host computing device 102 of a denial of delivery of an unsafe data packet. The communication module 208 may also be configured to receive communications from the host computing device 102 such as instructions 214 for determining unsafe data packets, a command to reboot the bus computing device 202, a command to deny all data packets from an untrusted computing device, or a command to reboot the untrusted computing device. The PMIC 206 is operable to deliver or deny power to the bus computing device 202. In response to a command from the host computing device 102, for example, the PMIC 206 may execute shut-down instructions to temporarily deny power to the bus computing device 202 to cause a reboot.

Figure 3:
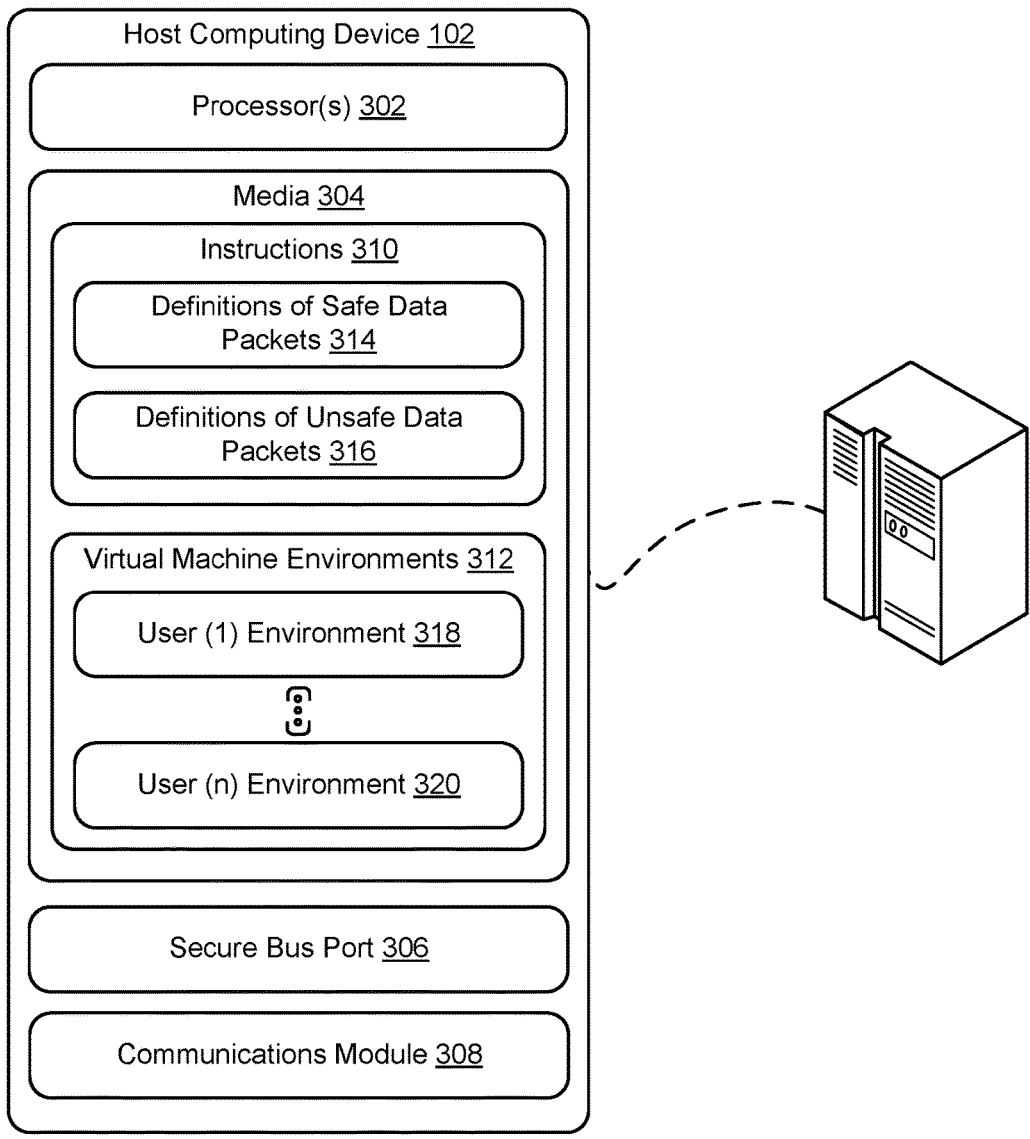
FIG. 3 is an illustration of a host computing device in accordance with one or more implementations.
Figure 4:
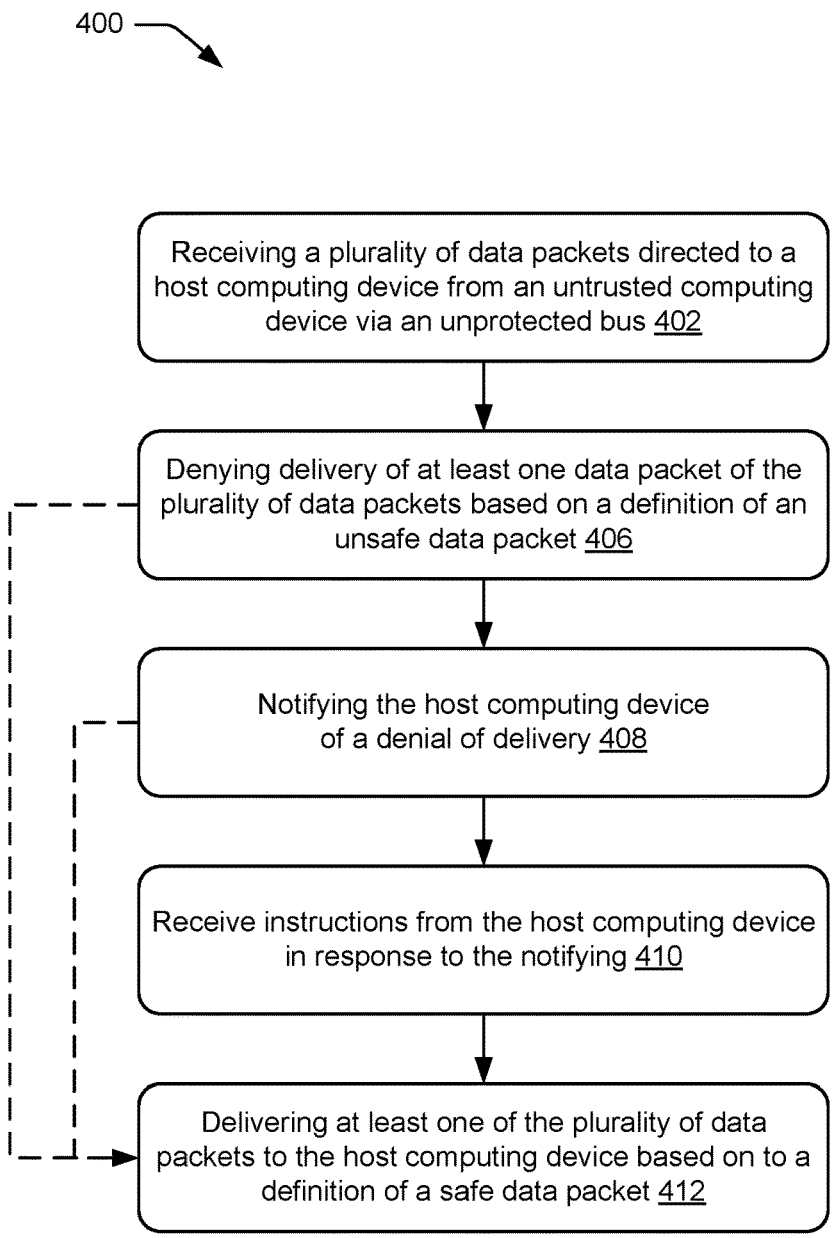
FIG. 4 is a flow diagram that describes operations in a method in accordance with one or more implementations.

FIG. 3 illustrates an example implementation of the host computing device 102 of FIG. 1 in further detail. The host computing device 102 is shown as a singular entity for visual brevity, though multiple devices may instead be used. The host computing device 102 includes or has to access to server processor(s) 302, computer-readable storage media ("media") 304, a secure hardware bus port 306 for receiving data packets via the secure hardware bus 104, and a communication module 308. Media 304 includes or has access to instructions 310 for secure hardware bus 104 and virtual machine environments 312.

The instructions 310 include definitions of safe data packets 314 and definitions of unsafe data packets 316 for delivery to and use by secure hardware bus 104 of FIGS. 1 and 2 via the communication module 308. The instructions 310 may include definitions based on one or more elements of a data packet, such as a header, a payload, or a trailer. For example, definitions of unsafe data packets 316 may define data packets as unsafe that include a term identified as unsafe in the header of the data packet. In an example implementation, definitions of unsafe data packets 316 defines all data packets including "failure" in the header as an unsafe data packet. Definitions of safe data packets 314 may be defined based on one or more elements of a data packet, or alternatively, may be defined as any not identified as unsafe. In some implementations, only one of definitions of safe data packets 314 or definitions of unsafe data packets 316 are delivered to the bus computing device 202.

The instructions 310 may also include instructions and commands for responding to a notification of a denial of delivery. As discussed above, the instructions 310 may include a command to reboot the secure hardware bus, a command to deny all data packets from an untrusted computing device, or a command to reboot the untrusted computing device.

Virtual machine environments 312 include user (1) environment 318 and user (n) environment 320. As illustrated, the host computing device 102 allows multiple virtual machine environments (operating system instances or application instances) to exist simultaneously and to share resources of the host computing device 102, such as storage device 110-1, graphics processing unit 110-2, networking device 110-3, and so forth. The multiple virtual machine environments access one or more of the shared resources via the secure hardware bus port 306, the secure hardware bus 104 and one or more unprotected hardware buses.

Example Method

The following discussion describes method 400 in an example implementation for securing communication from an unprotected hardware bus by placing a secure hardware bus between the unprotected hardware bus and a host computing device. Aspects of method 400 may be implemented in hardware, firmware, or software, or a combination thereof. Method 400 is shown as a set of blocks that specify operations performed by one or more devices and are not necessarily limited to the orders shown for performing the operations by the respective blocks. In portions of the following discussion, reference will be made to FIGS. 1-3.

At operation 402, a plurality of data packets directed to a host computing device are received from an untrusted computing device via an unprotected hardware bus. For example, the secure hardware bus 104 receives a plurality of data packets directed to the host computing device 102 from storage device 110-1 via unprotected hardware bus 108-1. The data packets may be received during use of the untrusted computing device by the host computing device directly, or by a user of a virtual machine environment of the host computing device. The user (1) environment 318, for instance, requests data to be processed by the graphics processing unit 110-2, resulting in a plurality of data packets being directed to the host computing device 102 via the unprotected hardware bus 108-2.

Delivery of at least one data packet of the plurality of data packets is denied based on a definition of an unsafe data packet at operation 402. This operation may be performed by a bus computing device such as the bus computing device 202 executing instructions 214 to determine that at least one of the plurality of data packets is unsafe. For example, the processor 204 may execute instructions 214 to perform a series of comparisons of the plurality of data packets with definitions of unsafe data packets 316. Data packets that match a definition of an unsafe data packet are identified as unsafe. Additionally or alternatively, the processor 204 may execute instruction 214 to identify data packets as unsafe by analyzing elements of the plurality of data packets to identify terms defined as unsafe. The bus computing device 202 then denies delivery of the unsafe data packets and allows delivery of safe data packets. The unsafe data packets may be stored in memory of the bus computing device or deleted upon denial of delivery. The unsafe data packets may include a notification of a system fault of the untrusted computing device that would cause the host computing device 102 to reboot if delivered to the host computing device 102. Thus, denying delivery of the unsafe data packets may prevent a reboot that would cause a denial of service for users of the virtual machine environments 312 on the host computing device 102.

At optional operation 408, the host computing device is notified of a denial of delivery. For example, the communication module 208 delivers a notification of a denial of delivery to the host computing device 102. Additional information such as a reason for denial or a type of unsafe data packet may also be delivered to the host computing device 102 to create a record of unsafe data packets and/or to provoke a response from the host computing device 102.

Instructions are received from the host computing device in response to the notification of a denial of delivery at operation 410. The host computing device 102, for instance, provides instructions 310 to the secure hardware bus 104 via the communication module 208. The instructions 310 may include a command to reboot the bus computing device 202, a command to deny all data packets from an untrusted computing device, or a command to reboot the untrusted computing device. A command to reboot the bus computing device 202 is performed, for example, by the processor(s) 202 and may include shutting off power to the bus computing device 202 at the PMIC 206. A command to deny all data packets from an untrusted computing device may be performed by the bus computing device 202 and may close communication channels with the untrusted device at the bridge 106.

At operation 412, at least one safe data packet is delivered to the host computing device based on a definition of a safe data packet. For example, a communication channel of secure hardware bus 104 delivers safe data packets from the unprotected hardware bus 108-1 to the host computing device 102. The safe data packets may include a response by the untrusted computing device to one or more commands or requests by the host computing device 102 to access resources. Additionally or alternatively, the safe data packets include the notification of the denial of delivery as discussed for operation 408.

Thus techniques for securing communication from an unprotected hardware bus described herein protect against delivering unsafe data packets from an unprotected hardware bus to a host computing device. As discussed herein, these techniques may be particularly useful to prevent an unsafe data packet from causing a system reboot of a computer, such as a server hosting a plurality of virtual machine environments.

Example System and Device

Figure 5:
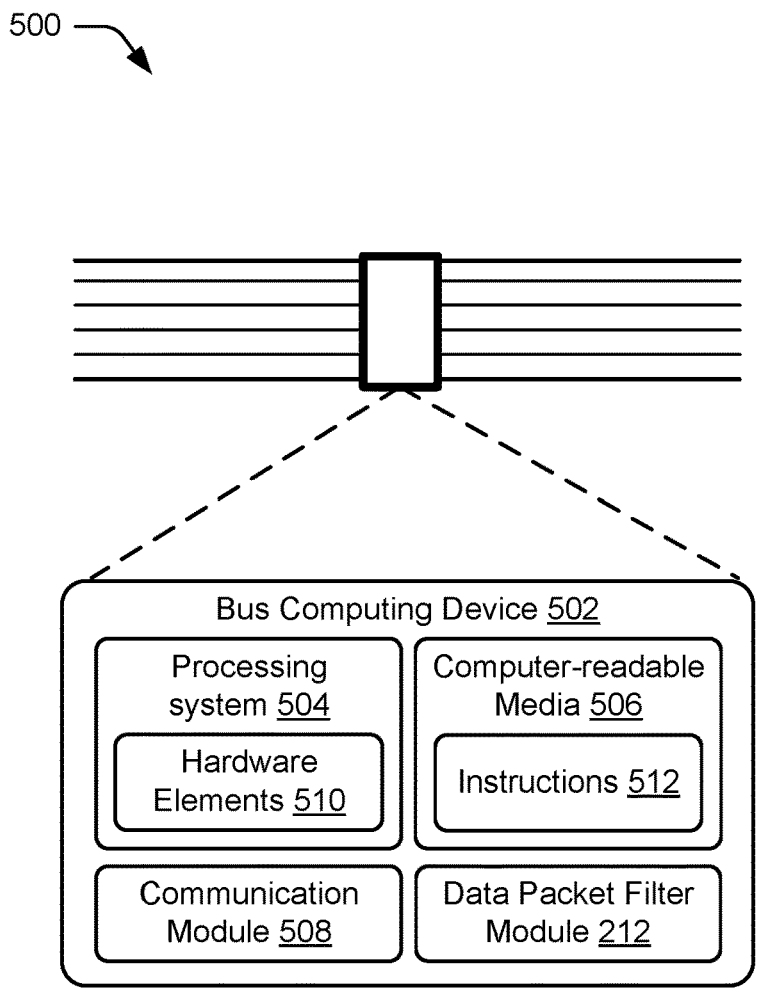
FIG. 5 illustrates an example system including various components of an example bus computing device that can be implemented as any type of bus computing device as described and/or utilized with reference to FIGS. 1-4 to implement aspects of the techniques described herein.

FIG. 5 illustrates an example system generally at 500 that includes an example bus computing device 502, which is representative of one or more computing systems and/or devices that may implement the various techniques described herein. This is illustrated through inclusion of data packet filter module 212, which may be configured to implement one or more operations performed by the bus computing device 202, relating to the bus computing device 202 filtering data packets directed to the host computing device 102 as discussed herein. For example, data packet filter module 212 may access instructions 512 via computer-readable media 506 for use in determining unsafe data packets within the data packets directed to the host computing device 102.

The bus computing device 502 may include, for example, an FPGA chip comprising one or more of the illustrated elements of the bus computing device 502. Additionally or alternatively, the bus computing device 502 may include multiple distinct component devices. The bus computing device 502 may be added to a hardware bus as a bridge or adaptor, for example, or may be internal to the hardware bus as in a Thunderbolt™ hardware bus or Lightning™ hardware bus, for example.

The bus computing device 502 as illustrated includes a processing system 504, one or more computer-readable media 506, and a communication module 508 that are communicatively coupled, one to another. Although not shown, the bus computing device 502 may further include a system hardware bus or other data and command transfer system that couples the various components, one to another. A system hardware bus can include any one or combination of different hardware bus structures, such as a memory hardware bus or memory controller, a peripheral hardware bus, a universal serial hardware bus, and/or a processor or local hardware bus that utilizes any of a variety of hardware bus architectures. A variety of other examples are also contemplated, such as control and data lines.

Processing system 504 is representative of functionality to perform one or more operations using hardware. Accordingly, processing system 504 is illustrated as including hardware elements 510, which may be configured as processors, functional blocks, one or more FPGAs, and so forth. This may include implementation in hardware as an application-specific integrated circuit or other logic device formed using one or more semiconductors. Hardware elements 510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable media 506 is illustrated as including instructions 512. The instructions 512 are executable by the data packet filter module to identify unsafe data packets. The instructions 512 are stored in memory/storage associated with one or more computer-readable media. Memory/storage may include volatile media (such as random access memory (RAM)) and/or nonvolatile media (such as read only memory (ROM), Flash memory, optical disks, magnetic disks, and so forth). Memory/storage may include fixed media (e.g., RAM, ROM, a fixed hard drive, and so on) as well as removable media (e.g., Flash memory, a removable hard drive, an optical disc, and so forth). Computer-readable media 506 may be configured in a variety of other ways as further described below.

Communication module 508 is representative of functionality to allow the bus computing device 502 to receive commands and information from the host computing device 102 and also to deliver data packets to the host computing device 102 and peripheral computing devices. For example, the communication module 508 may receive instructions 512 from the host computing device 102 and may deliver a notification of a denial of delivery of an unsafe data packet to the host computing device 102. The communication module 508 may also deliver a reboot command to a peripheral computing device.

Various techniques may be described herein in the general context of software, hardware elements, or program modules. Generally, such modules include routines, programs, objects, elements, components, data structures, and so forth that perform particular tasks or implement particular abstract data types. The entities described herein (e.g., the data packet filter module 212) generally represent software, firmware, hardware, or a combination thereof. The features of the techniques described herein are platform-independent, meaning that the techniques may be implemented on a variety of commercial computing platforms having a variety of processors.

An implementation of the described entities and techniques may be stored on or transmitted across some form of computer-readable media. The computer-readable media may include a variety of media that may be accessed by the bus computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Computer-readable storage media do not include signals per se. Computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the bus computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 510. The bus computing device 502 may be configured to implement particular instructions and/or functions corresponding to the software and/or hardware modules. Accordingly, implementation of a module that is executable by the bus computing device 502 as software may be achieved at least partially in hardware, e.g., through use of computer-readable storage media and/or hardware elements 510 of processing system 504. The instructions and/or functions may be executable/operable by one or more articles of manufacture (for example, one or more bus computing devices 502 and/or processing systems 504) to implement techniques, modules, and examples described herein.

The techniques described herein may be supported by various configurations of the bus computing device 502 and are not limited to the specific examples of the techniques described herein.

EXAMPLE IMPLEMENTATIONS

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

Example 1

A secure hardware bus for securing communication from an unprotected hardware bus for communication with a host computing device, the secure hardware bus comprising: a communication channel having at least one communication path in electrical communication with the host computing device; and a bridge in electrical communication with the communication channel and operable to allow electrical communication between the communication channel and the unprotected hardware bus, the bridge including a bus computing device, the bus computing device operable to execute computer-readable instructions to allow safe data packets through to the host computing device via the communication channel and to deny unsafe data packets from delivery to the host computing device.

Example 2

The secure hardware bus of example 1, wherein the bridge is configured to deny all data packets from delivery to the host computing device via the communication channel in response to a loss of power.

Example 3

The secure hardware bus of example 2, wherein the bridge further comprises a power management device configured to receive shut-down instructions from the host computing device to deny power to the bus computing device.

Example 4

The secure hardware bus of example 1, wherein the bus computing device receives the computer-readable instructions from the host computing device.

Example 5

The secure hardware bus of example 1, wherein the computer-readable instructions are stored in volatile memory such that at least a portion of the computer-readable instructions are lost in response to a loss of power.

Example 6

The secure hardware bus of example 5, wherein the bus computing device is configured to retrieve the computer-readable instructions from the host computing device in response to restoring power.

Example 7

The secure hardware bus of example 1, wherein the secure hardware bus is configured to notify, via a communication module, the host computing device of unsafe data packets denied from delivery to the host computing device.

Example 8

The secure hardware bus of example 1, wherein the secure hardware bus follows a first hardware bus protocol and the unprotected hardware bus follows a second hardware bus protocol and wherein the bridge is configured to translate between the second hardware bus protocol and the first hardware bus protocol.

Example 9

The secure hardware bus of example 1, wherein the unprotected hardware bus includes a peripheral component interconnect hardware bus or a peripheral component interconnect express hardware bus.

Example 10

A method for securing communication from an unprotected hardware bus for communication with a host computing device, the method comprising: receiving, by a secure hardware bus in communication with, and external to, the host computing device, data packets from an untrusted computing device via the unprotected hardware bus, the data packets directed to the host computing device; identifying, by a computing device of the secure hardware bus, an unsafe data packet of the data packets; and denying, by the secure hardware bus, the unsafe data packet from delivery to the host computing device based on identifying the unsafe data packet.

Example 11

The method of example 10, wherein the computing device of the secure hardware bus is located on a bridge of the secure hardware bus, and wherein the bridge comprises a port to receive the data packets from the unprotected hardware bus.

Example 12

The method of example 10, wherein the identifying matches the unsafe data packet to a definition of an unsafe data packet received from the host computing device.

Example 13

The method of example 12, wherein the definition of an unsafe data packet includes a definition of a system fault notification.

Example 14

The method of example 10, further comprising notifying the host computing device of the denying of the unsafe data packet.

Example 15

A method as in example 14, further comprising communicating a reboot command to the untrusted computing device, the command in response to the notifying.

Example 16

The method of example 14, further comprising denying all data packets from the untrusted computing device based on a command from the host computing device, the command in response to the notifying.

Example 17

A system comprising: a secure hardware bus in electrical communication with a host computing device to communicate data packets to the host computing device, the secure hardware bus comprising a processor operable to execute instructions to identify unsafe data packets from the data packets and deny delivery of the unsafe data packets to the host computing device; and a peripheral component interconnect hardware bus electrically coupled to the secure hardware bus via a bridge of the secure hardware bus, the peripheral component interconnect hardware bus operable to communicate the data packets from an untrusted computing device to the secure hardware bus for identification of the unsafe data packets.

Example 18

The system of example 17, wherein the bridge includes a communication channel comprising a plurality of communication paths to facilitate communication of the data packets from a plurality of untrusted computing devices to the host computing device.

Example 19

The system of example 17, wherein the instructions further cause the external hardware bus to notify the host computing device of a denial of delivery.

Example 20

The system of example 19, wherein the secure hardware bus receives a command from the host device to deny delivery of all data packets from the untrusted computing device, the command received in response to the notifying the host computing device of the denial of delivery.

CONCLUSION

Although the implementations have been described in language specific to structural features and/or methodological acts, it is to be understood that the implementations defined in the appended claims are not necessarily limited to the specific features or acts described. Rather, the specific features and acts are disclosed as example forms of implementing the claimed implementations.

What is claimed is:

1. A secure hardware bus for securing communication from a peripheral device via an unprotected hardware bus for communication with a host computing device via the secure hardware bus, the secure hardware bus comprising:
   a communication channel having at least one communication path in electrical communication with the host computing device; and
   a bridge between and interconnecting the unprotected hardware bus and the communication channel of the secure hardware bus, the bridge being in electrical communication with the host computing device via the communication channel and in electrical communication with the peripheral device via the unprotected hardware bus, the bridge including a bus computing device having a processor and memory with instructions executable by the processor to cause the bus computing device to:
      in response to receiving a packet from the peripheral device via the unprotected hardware bus,
         determine whether the received packet is a safe packet based on a library of unsafe data packets or components thereof, or a formula for determining whether the packet is safe;
      in response to determining that the received packet is safe, forward the received packet to the host computing device via the communication channel; and in response to determining that the received packet is unsafe, deny delivery of the received packet to the host computing system.

2. The secure hardware bus of claim 1, wherein the bus computing device receives the computer-readable instructions from the host computing device.

3. The secure hardware bus of claim 1, wherein the secure hardware bus is configured to notify, via a communication module, the host computing device of unsafe data packets denied from delivery to the host computing device.

4. The secure hardware bus of claim 1, wherein the secure hardware bus follows a first hardware bus protocol and the unprotected hardware bus follows a second hardware bus protocol and wherein the bridge is configured to translate between the second hardware bus protocol and the first hardware bus protocol.

5. The secure hardware bus of claim 1, wherein the unprotected hardware bus includes a peripheral component interconnect hardware bus or a peripheral component interconnect express hardware bus.

6. The secure hardware bus of claim 1, wherein the bridge is configured to deny all data packets from delivery to the host computing device via the communication channel in response to a loss of power to the bus computing device.

7. The secure hardware bus of claim 6, wherein the bridge further comprises a power management device configured to receive shut-down instructions from the host computing device to deny power to the bus computing device.

8. The secure hardware bus of claim 1, wherein the computer-readable instructions are stored in volatile memory such that at least a portion of the computer-readable instructions are lost in response to a loss of power.

9. The secure hardware bus of claim 8, wherein the bus computing device is configured to retrieve the computer-readable instructions from the host computing device in response to restoring power.

10. A method for securing communication from an untrusted computing device via an unprotected hardware bus for communication with a host computing device via a secure hardware bus having a bridge between and interconnecting the unprotected hardware bus and the secure hardware bus, the method comprising:
receiving, at the bridge, data packets from the untrusted computing device via the unprotected hardware bus, the data packets being directed to the host computing device; and
in response to receiving the data packets from the untrusted computing device via the unprotected hardware bus, at the bridge,
determining whether the received data packets are safe packets based on a library of unsafe data packets or components thereof, or a formula for determining whether the data packets are safe;
in response to determining that the received data packets are safe, forward the received data packets to the host computing device via the secure hardware bus; and
in response to determining that the received data packets are unsafe, denying, by the bridge, the received data packets from delivery to the host computing device.

11. The method of claim 10, wherein the bridge comprises a port to receive the data packets from the unprotected hardware bus.

12. The method of claim 10, wherein the determining is based on a definition of an unsafe data packet received from the host computing device.

13. The method of claim 12, wherein the definition of the unsafe data packet includes a definition of a system fault notification.

14. The method of claim 10, further comprising notifying the host computing device of the denying.

15. The method of claim 14, further comprising communicating a reboot command to the untrusted computing device, the command in response to the notifying.

16. The method of claim 14, further comprising denying all data packets from the untrusted computing device based on a command from the host computing device, the command in response to the notifying.

17. A method for securing communication from an unprotected hardware bus for communication with a host computing device, the method comprising:
receiving, by a secure hardware bus in communication with, and external to, the host computing device, data packets from an untrusted computing device via the unprotected hardware bus, the data packets directed to the host computing device;
identifying, by a computing device of the secure hardware bus, an unsafe data packet of the data packets;
denying, by the secure hardware bus, the unsafe data packet from delivery to the host computing device based on identifying the unsafe data packet;
notifying the host computing device of the denying of the unsafe data packet; and
communicating a reboot command to the untrusted computing device in response to the notifying.

18. The method of claim 17, wherein receiving the data packets includes receiving the data packets at a bridge of the secure hardware bus, the bridge having a communication channel with a plurality of communication paths to facilitate communication of the data packets from the untrusted computing device to the host computing device.

19. The method of claim 17, wherein receiving the data packets includes receiving the data packets at a bridge that is configured to deny all data packets from delivery to the host computing device in response to a loss of power to the bridge.

20. The method of claim 17, wherein the secure hardware bus follows a first hardware bus protocol and the unprotected hardware bus follows a second hardware bus protocol, and receiving the data packets includes receiving the data packets at a bridge that is configured to translate between the second hardware bus protocol and the first hardware bus protocol.

* * * * *